Oct. 20, 1936.  W. D. SCHMIDT  2,058,359

BORING MACHINE

Filed Jan. 5, 1934  3 Sheets-Sheet 1

Inventor
William D. Schmidt
By Geo. H. Kennedy Jr.
Attorney

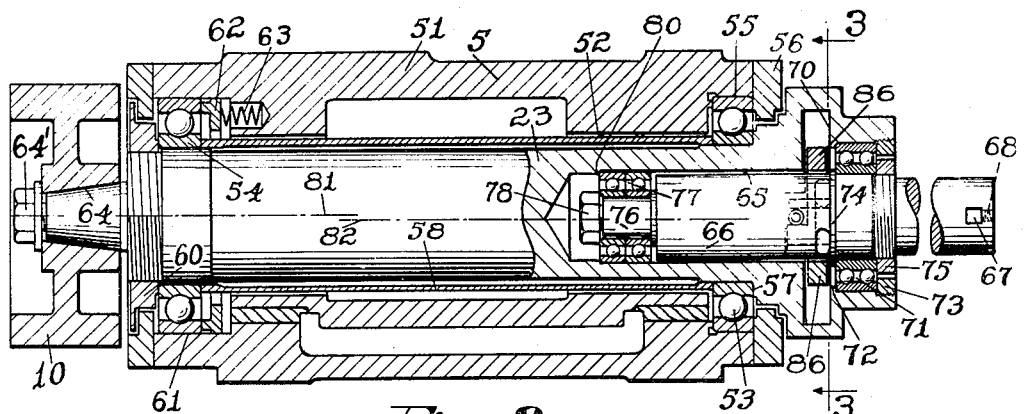
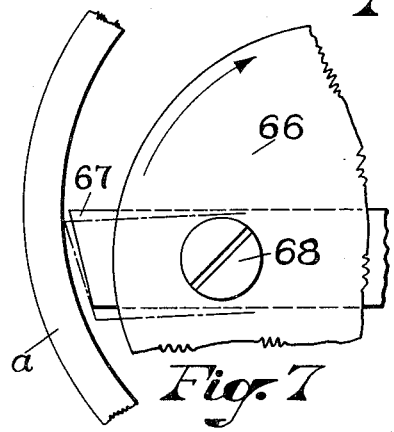
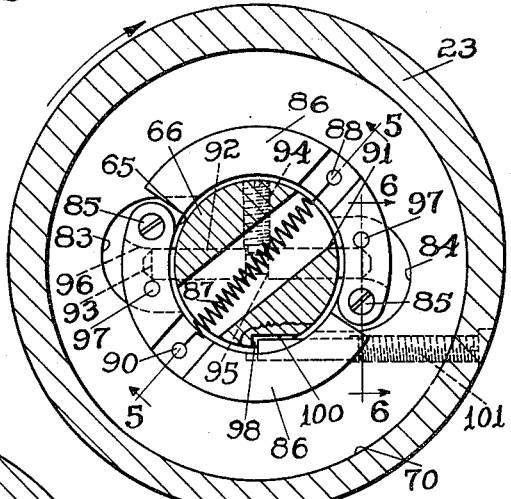
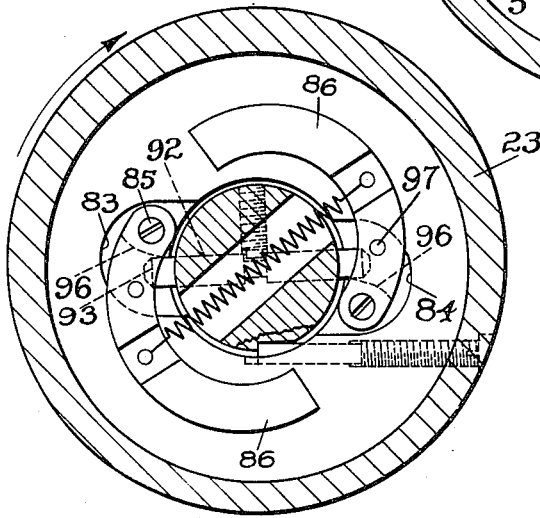

Oct. 20, 1936.  W. D. SCHMIDT  2,058,359
BORING MACHINE
Filed Jan. 5, 1934  3 Sheets-Sheet 3

Inventor
William D. Schmidt
Geo. H. Kennedy Jr.
Attorney

Patented Oct. 20, 1936

2,058,359

UNITED STATES PATENT OFFICE 2,058,359

BORING MACHINE

William D. Schmidt, Worcester, Mass., assignor to The Heald Machine Company, Worcester, Mass., a corporation of Massachusetts Application January 5, 1934, Serial No. 705,406

16 Claims. (Cl. 77—3)

The present invention relates to boring machines and particularly to a structure which provides a separation or back-off between the surface of the workpiece and the cutting tool to avoid contact between said tool and the finished surface of the workpiece while the tool is being withdrawn from said workpiece.

In prior devices of this character, the workpiece is mounted in a suitable workholding structure and the boring tool is carried in the end of a rotatably driven boring bar which is fed axially through the workpiece for procuring a boring operation on the internal surface of said workpiece. The tool and workpiece are preferably so mounted that the workpiece is reduced to the desired size during a single axial movement of the boring tool through the workpiece, and the boring tool and workpiece are then axially separated by a rapid withdrawal movement. If the boring tool is rotated during the withdrawal movement, the cutting point of the tool leaves a spiral groove in the finished surface of the workpiece which diminishes the salability of the workpiece and also affects its utility, particularly when the workpiece is used to provide a bearing surface.

It has been a well known practice in some boring machines, to bring the boring tool to rest before it is withdrawn from the bore of the workpiece. With the boring tool at rest, the cutting point of the tool engages the surface of the workpiece during the withdrawal movement and this engagement results in the formation of a groove in the finished surface of the workpiece parallel to the axis thereof. This groove is also detrimental to the usefulness of the finished surface of the workpiece as a bearing surface as well as to the salability of the workpiece, as will be apparent. The principal object of the present invention is accordingly to provide for eliminating the objectionable groove formed in the workpiece during withdrawal of the cutting tool therefrom.

The present invention is arranged particularly for use in connection with machines of the type disclosed in the copending application of Schmidt (the present inventor) Serial No. 552,625, filed July 23, 1931. In this machine, the cutting tool is positively rotated during the relative axial movement of said cutting tool through the workpiece in one direction; the cutting tool is then brought to rest before the beginning of the axial retracting movement which withdraws the cutting tool from within the bore of the workpiece. The present invention is arranged to provide a cutting member which is automatically withdrawn from its operative cutting position before the withdrawal movement of the cutting member takes place so that the cutting tool will be spaced from the finished surface of the workpiece during the relative axial withdrawal movement of said cutting member. A further object of the invention resides in a retracting structure which forms a part of the toolhead in which the spindle for the cutting member is journaled and which is automatically operative upon cessation of the rotation of said spindle for retracting the cutting tool from its operative position and, when the spindle is again set in rotation, for advancing the tool into cutting position.

Other and further objects and advantages of the invention will appear from the following detailed description taken in connection with the accompanying drawings in which:—

Fig. 2 is a vertical axial section through a toolhead.

Fig. 3 is a vertical section along the line 3—3 of Fig. 2, showing the mechanism for advancing or retracting the boring tool when the boring spindle is at rest.

Fig. 4 is a section corresponding to Fig. 3, showing the structure of Fig. 3 in the position which it assumes during positive rotation of the tool spindle.

Fig. 7 is a diagrammatic view showing the relation of the tool and workpiece in operative and inoperative positions.

Like reference characters refer to like parts in the different figures.

Figure 1:
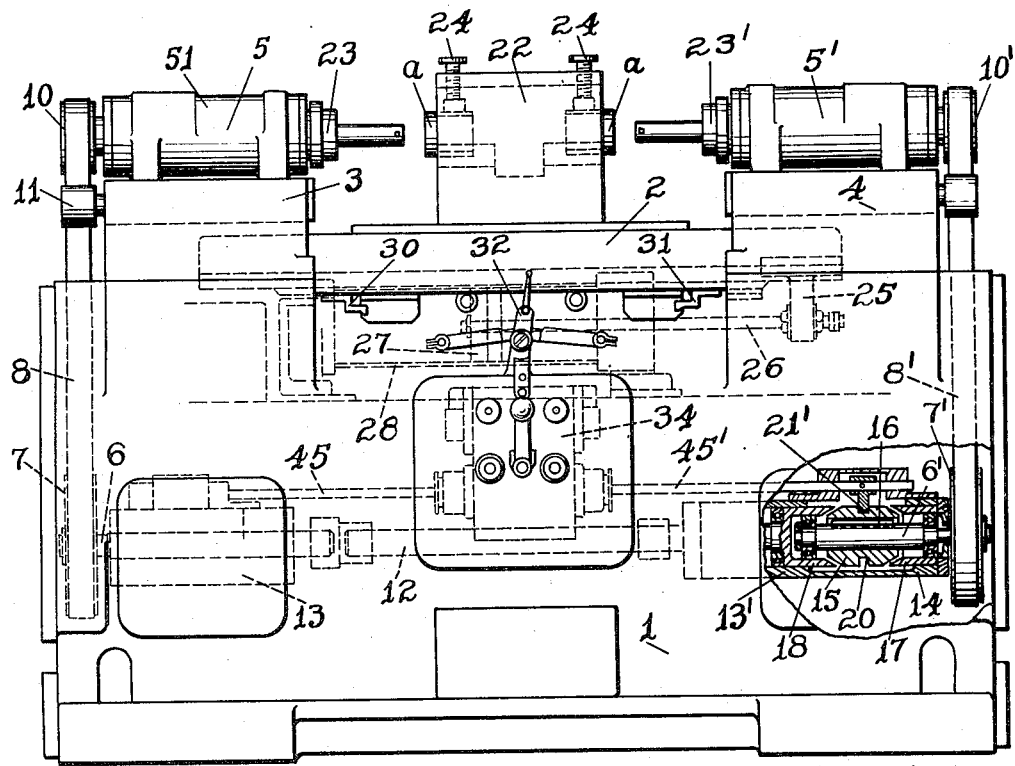
Fig. 1 is a front elevation of a machine embodying the invention.

Referring first to Fig. 1, the machine is similar, in general, to the boring machine fully described in the above cited copending application Serial No. 552,625. As shown, the machine comprises a base 1 having guideways, not shown, upon which is slidably mounted a table or carriage 2. Bridges 3 and 4 at the left and right hand ends of the base span the guideways provided for the movement of the carriage, and the bridges form supports for toolheads 5 and 5' mounted on the upper surfaces of said bridges. Although each bridge is arranged to support a plurality of toolheads, only one toolhead is shown on each bridge and the description will be directed to this particular arrangement.

The spindle in the toolhead 5 on the left hand bridge is driven from a shaft 6, which carries a pulley 7, by a belt 8 which passes from said pulley 7 around a pulley 10 on the spindle in the toolhead and around an idler pulley 11 secured to the bridge. The spindle in the toolhead 5' on the right hand bridge 4 is rotated in the same manner by a belt 8' which connects the driving pulley 7' on the shaft 6' to the pulley 10' on the spindle. The shafts 6 and 6' are driven from a positively actuated drive shaft 12 suitably connected to a source of power, not shown, said drive shaft being connected through clutch and brake units 13 and 13' respectively to the shafts 6 and 6'. The clutch and brake units are separately controlled so that the spindle in the toolhead on either bridge may be rotated independently of the movements of the spindle in the toolhead on the opposite bridge.

The clutch and brake units 13 and 13' are similar in construction and a description of one will suffice for both. Referring to Fig. 1, which shows the unit 13' in section, the shaft 6' which is journaled in a housing 14 has a clutch member 15 slidable thereon and secured against rotation relative thereto by a key 16. The clutch member 15 is provided with conical portions at opposite ends thereof and the right hand portion engages, at its right hand end of movement, with a conical brake member 17 forming a part of the housing 14, to hold the shaft 6', and accordingly the spindles in the toolheads 5', against rotation. The clutch member 15, when moved to the left out of engagement with the brake member 17 engages a conical member 18 which is secured to the end of the drive shaft 12, above noted, so that when the clutch member 15 is shifted to the left hand end of its movement, said member engages the conical member 18 to procure rotation of the shaft 6' in unison with the drive shaft 12. A circumferential groove 20 in the clutch member 15 is engaged by an actuating member 21' for shifting of said clutch member by a sliding movement of said actuating member.

The work to be operated upon is carried by a fixture or bracket 22 mounted substantially centrally of the table and said fixture is arranged to support workpieces a on both sides thereof in alinement with the axes of the tool spindles 23 and 23' in the toolheads 5 and 5'. Thus, during movement of the table 2 to the right, the workpiece a in the right hand end of the fixture 22 is operated upon by the boring tool supported by the spindle 23' journaled in the right hand toolhead 5'. During movement of the table to the left, the boring tool carried by the spindle 23 in the toolhead 5 engages the workpiece a in the left hand end of the fixture 22. While one of the workpieces is being operated upon by the corresponding boring tool, the finished workpiece in the opposite side of the fixture may be removed by release of the clamping member 24 which holds said workpiece in position, and an unfinished workpiece is then positioned in said fixture.

Figure 8:
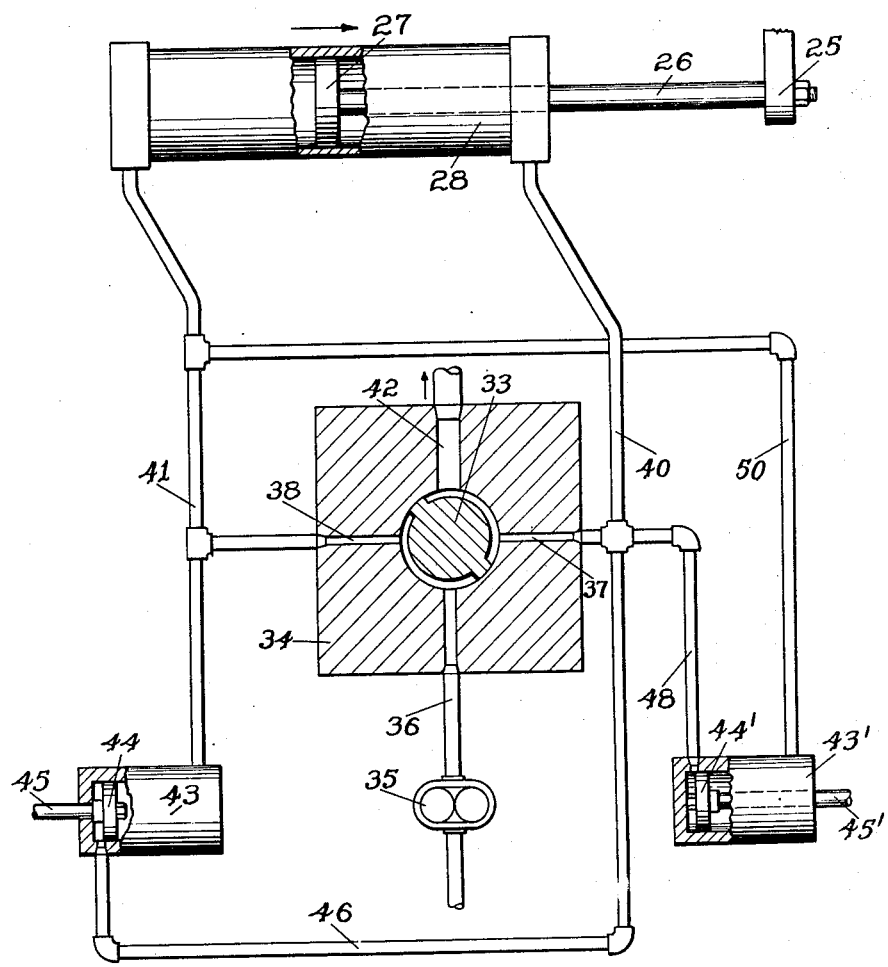
Fig. 8 is a fluid pressure diagram.

The table is reciprocated by any suitable mechanism, preferably the fluid pressure actuated mechanism shown in Fig. 8. Referring to this figure, the table 2 has a depending lug 25 to which the end of a piston rod 26 is connected, and the opposite end of the piston rod is secured to a piston 27 slidable in a cylinder 28 mounted within the base of the machine. Reversal of the table at opposite ends of its movement is procured by reversing dogs 30 and 31 on said table, which alternately engage and rock a reversing lever 32, Fig. 1, connected to a suitable reversing valve 33 in a valve casing 34, the latter being positioned within the base of the machine. Fluid under pressure is provided by a pump 35 which directs fluid through a conduit 36 into the opening in the casing 34 provided for the reversing valve. Said casing is also provided with channels 37 and 38 which are connected by conduits 40 and 41 respectively to the right and left hand ends of the cylinder 28. The casing 34 is also provided with an exhaust outlet 42. The valve 33 in the position shown directs fluid under pressure to the left hand end of the cylinder 28 and permits fluid from the right hand end of said cylinder to exhaust through the outlet 42, procuring movement of the table to the right. Reversal of the valve 33, by engagement of the dog 30 with the reversing lever 32, procures admission of fluid under pressure to the right hand end of the cylinder and connects the left hand end of the cylinder to the exhaust opening, thereby reversing the table movement.

As pointed out in the above cited application Serial No. 552,625, the boring tool carried by the toolhead 5' on the right hand bridge is brought to rest at the right hand end of the table movement through automatic actuation of the clutch and brake unit 13' after said boring tool has completed its operation on the workpiece a during the movement of said table to the right, so that during subsequent movement of the table to the left, said boring tool is at rest. Similarly, the rotation of the boring tool carried by the toolhead 5 on the left hand bridge is stopped at the left hand end of the table movement through automatic actuation of the clutch and brake unit 13 in order that the tool may be at rest during withdrawal of the workpiece from overlying relation to the tool, said withdrawal movement being effected by a subsequent movement of the table to the right.

The structure of the clutch and brake units has been disclosed above, and each clutch and brake unit is controlled by fluid pressure actuated mechanism. As shown in Fig. 8, a cylinder 43 has a piston 44 positioned therein to which a piston rod 45 is secured. Said piston rod extends to the left, as indicated in Fig. 1, and is secured to the actuating member for the clutch and brake unit 13. The left hand end of the cylinder 43 is connected by a conduit 40 between the reversing valve and the right hand end of the cylinder 28 and the right hand end of the cylinder 43 is connected by a conduit 47 to the conduit 41 between the reversing valve and the left hand end of the cylinder 28. Thus, with the reversing valve 33 in the position shown in Fig. 8, fluid is admitted to the left hand end of the cylinder 28, procuring movement of the table to the right. At the same time, fluid under pressure passes through the conduit 47 into the right hand end of the cylinder 43, urging the piston 44 to the left hand end of said cylinder. The clutch and brake unit 13 is positioned within the base in the opposite direction to the position of the clutch and brake unit 13', so that movement of the actuating member to the left renders the brake element of said unit operative to bring the spindle in the toolhead 5 on the left hand bridge to rest. Movement of the actuating member to the left results from movement of the piston 44 to the left which, as will be apparent, occurs at the left hand end of the table movement when the reversing valve 33 is shifted into the position shown.

A cylinder 43' which is positioned within the base of the machine has a piston 44' slidable therein, and a piston rod 45' secured to said piston projects to the right beyond the cylinder and engages the actuating member 21' of the clutch and brake unit 13'. The left hand end of the cylinder 43' is connected by a conduit 48 to the conduit 40 between the reversing valve 33 and the right hand end of the cylinder 28, and the right hand end of the cylinder 43' is connected by a conduit 50 to the conduit 41 between the reversing valve and the left hand end of the cylinder 28. With the reversing valve in the position shown, fluid under pressure is directed to the left hand end of the cylinder 28, thereby procuring movement of the table 1 to the right as above stated, and at the same time fluid under pressure enters the right hand end of the cylinder 43' through the conduit 50 to urge the piston 44' to the left hand end of its movement. Movement of the piston 44' to the left carries the actuating member 21' to the left to render operative the clutch elements of the clutch and brake unit 13' to procure positive rotation of the spindle in the toolhead 5'. When the table 1 reaches the right hand end of its movement and the reversing valve 33 is shifted, fluid under pressure enters the left hand end of the cylinder 43' to urge the piston 44' to the right, thereby disengaging the clutch elements and engaging the brake elements of the clutch and brake unit 13' to bring the spindle and the toolhead 5' to rest before the table 1 begins its movement to the left.

Although it appears from Fig. 8 that the cylinders 43 and 43' are separate elements, they are actually formed in the casing 34 as indicated in Fig. 1, the showing of Fig. 8 being diagrammatic in order that the connections between the parts may be more readily apparent.

By the actuation of the clutch and brake units 13 and 13' in the manner above described, it will be apparent that each boring tool is set in motion at the beginning of the movement of the table toward the corresponding boring tool. Thus, the boring tool in the left hand toolhead 5 is set in rotation at the right hand end of the table movement as the latter begins its movement to the left and the boring tool is brought to rest at the left hand end of the table movement. Similarly, the boring tool in the right hand toolhead 5' is set in motion when the table is reversed at the left hand end of its movement and said toolhead is brought to rest at the right hand end of the movement of the table. Each boring tool is thus positively rotated while the corresponding workpiece is moved axially past said tool for a boring operation thereon and the tool is then brought to rest so that said tool is not rotating during the axial withdrawal movement of the workpiece from said boring tool.

Without any provision for a relative separation of the boring tool radially from the workpiece during the withdrawal movement of said workpiece, the cutting point of the boring tool, as above stated, will leave a groove in the finished surface of the workpiece which is detrimental to the value of the workpiece. The present invention provides for a suitable retraction of the cutting point of the boring tool to avoid the formation of the objectionable groove and the retraction of the cutting point takes place when the boring tool is brought to rest at the completion of the boring operation and before the withdrawal movement of the workpiece relative to the boring tool takes place. Since the toolheads, which incorporate the structure by which the retraction of the boring tool is procured, are identical, only one toolhead will be described.

Referring now to Figs. 2, 3 and 4, the toolhead 5, which is identical in construction to the toolhead 5', comprises a casing 51 which is arranged to be positively secured to the bridge by any suitable structure, and said casing is provided with a longitudinal bore 52 therethrough for the reception of the tool spindle 23, the latter being supported by antifriction bearing members 53 and 54 at opposite ends thereof. As shown, the outer race of the bearing member 53 is received in an annular recess 55 in the casing in which it is held by a plate 56 suitably secured to the end of the casing. The inner race of the bearing 53 engages a shoulder 57 on the spindle, and said race is held in spaced relation to the inner race of the bearing member 54 by a sleeve 58 which fits over the spindle 23 and engages at opposite ends with the inner raceways of the bearings 53 and 54 respectively. A clamping nut 60 engages a threaded portion of the spindle 23 and holds the inner race of the bearing members 53 and 54 in proper position on said spindle. The outer race of the bearing 54 is slidable in an annular groove 61 in the casing 51 and is engaged by a ring 62 which is urged to the left by a series of springs 63. In this manner, any play in the bearing members 53 and 54 is taken up by shifting the position of the outer race of the bearing member 54 by said spring, and the spindle 23 is accordingly accurately centered at all times within the casing 51. The end of the spindle 23 beyond the threaded portion engaged by the clamping nut 60 has a tapered portion 64 which receives the pulley 10, the latter being securely held on said shaft by a nut 64' engaging the extreme end of said shaft.

The end of the spindle 23 opposite the pulley 10 is provided with a cylindrical recess 65 in which is positioned a boring bar 66, the latter carrying, adjacent its outer end, a radially extending boring tool 67, held in adjusted position relative to said bar by a set screw 68, as best shown in Fig. 7. The cylindrical recess 65 adjacent the outer end thereof is provided with an enlarged annular portion or recess 70 for a purpose which will hereinafter appear, and between said recess 70 and the end of the spindle 23, the recess 65 is slightly enlarged to receive antifriction bearing members 71. The outer race of the bearing member 71 engages an inwardly projecting flange 72 adjacent the annular recess 70 and is clamped against said flange by an externally threaded nut 73 which engages a threaded portion of said spindle 23. The inner race of the bearing member 71 is clamped against a shoulder 74 on the boring bar by a nut 75 which engages a threaded portion of said bar. The inner end of the boring bar, within the recess 65, has a reduced portion 76 for the reception of the inner races of bearing members 77, said races being secured against movement on the reduced portion 76 by a nut 78 which engages the end of said bar. The outer races of the bearing members 77 are slidable in the cylindrical recess 65, and when the boring bar is mounted in the spindle 23, said races engage against a shoulder 80 provided in said cylindrical recess. The boring bar is thus mounted against axial movement within the spindle 23 and is freely turnable angularly relative thereto.

The boring bar is eccentrically positioned in the spindle 23, as will be apparent from Fig. 2, in which the dot-dash line 81 indicates the center line of the spindle 23, and the dot-dash line 82 indicates the center line of the cylindrical recess 65 and the axis of the boring bar. It will be apparent that by an angular turning movement of the boring bar in the tool spindle, the boring tool will be advanced or retracted relative to the center line of said spindle. As pointed out above, the advance of the tool is procured when the spindle 23 is set in rotation and the tool is retracted when the spindle 23 is brought to rest.

Figure 5:
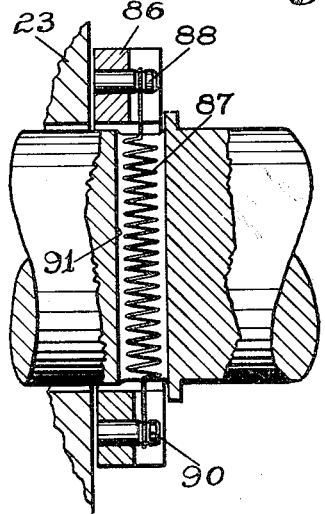
Fig. 5 is a fragmentary sectional view along the line 5—5 of Fig. 3.
Figure 6:
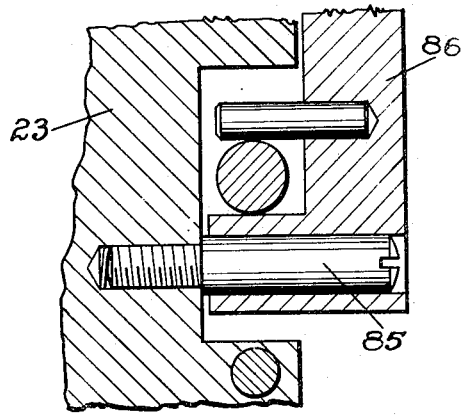
Fig. 6 is a fragmentary sectional view along the line 6—6 of Fig. 3.

Referring now to Figs. 3, 4 and 6, the spindle 23 is provided with oppositely positioned recesses 83 and 84 opening into the recess 65 for the boring bar, and into the recess 70. Each of the recesses 83 and 84 is provided with a stud 85, Fig. 6, the end of which is screw threaded for engagement with a threaded opening in the spindle 23, and each of said studs provides a pivotal support for a substantially semi-circular arm 86. Each arm projects around the boring bar 66 as shown in Fig. 3, and the arms are held in this position by a spring 87, the opposite ends of which are connected to pins 88 and 90 on said arms. The spring, as shown in Figs. 3 and 5, extends through a channel 91 provided in the boring bar 66. Said bar is also provided with a cylindrical bore 92 therethrough for the reception of a pin 93 which is secured against movement in said bar by a set screw 94, the end of which engages an annular groove 95 in said pin. The opposite ends of the pin project beyond the periphery of the bar and engage cam surfaces 96 provided by the arms 86.

When the spindle 23 is at rest, the parts are in the position indicated in Fig. 3 and the arms 86 are held in spaced relation to the boring bar 66 by pins 97 positioned in said arms in spaced relation to the cam surfaces 96. Said pins engage the pin 93 when the arms 86 are urged into the position of Fig. 3 by the spring 87 and hold the ends of said pin in engagement with the cam surfaces 96. With the spindle at rest, the boring tool 67 assume the position indicated by the full lines in Fig. 7 in which position the cutting edge of said tool is retracted from the cutting position so that said tool will not engage the workpiece during retraction of the workpiece from overlying relation to the boring tool.

When the spindle 23 is set in rotation in the direction indicated by the arrows of Figs. 3 and 4, the arms 86 move outwardly by centrifugal force against the tension of the spring 87 into the position indicated in Fig. 4. The cam surfaces 96, during the outward swinging movement of the arms 86, by their engagement with the pin 93, cause the boring bar 66 to turn counterclockwise relative to the spindle, thereby bringing a flat surface 98 provided by a notch 100 in said bar into engagement with the end of a positioning screw 101. The latter engages a screw threaded portion of the spindle 23 and is adjustable therein to vary the extent of counterclockwise rotation of the boring bar as the latter is moved to bring the boring tool into operative position. As indicated in Fig. 7 by the dot-dash lines, the slight counterclockwise rotation of the boring bar relative to the spindle advances the boring tool into a position for engagement with the inner surface of the workpiece. As above stated, the boring bar is eccentrically mounted in the spindle 23 and an adjustment of the positioning screw 101 accordingly varies the position of the boring tool when the latter is in the operative dot-dash line position of Fig. 7, thereby varying the diameter of the bore in the workpiece acted upon by said tool.

From the foregoing, it will be apparent that as the tool spindle 23 is set in rotation, the boring tool is advanced into work-engaging position under the control of members actuated by centrifugal force, and, when the tool spindle 23 is brought to rest, the action of the spring 87 in connection with the pins 97 which engage the transverse pin 93 in the boring bar cause the boring tool to be automatically retracted from work-engaging position. By the boring machine structure above disclosed, which provides for automatic cessation of the rotation of the tool member before a relative axial withdrawal movement of the boring tool and the workpiece, it will be apparent that the boring tool is always retracted at the end of the boring operation before the withdrawal movement takes place.

I claim:

1. In a toolhead, a spindle mounted for rotation therein, a cutting tool carried by said spindle, centrifugally actuated means responsive to rotation of said spindle for shifting the position of said tool relative to said spindle and means to limit the shifting movement for determining the operative position of the tool.

2. In a toolhead, a spindle mounted for rotation therein, a cutting tool carried by said spindle, centrifugally actuated means responsive to rotation of said spindle for shifting the position of said tool relative to said spindle, means for limiting the shifting movement for determining the operative position of the tool and means to return said tool to original position upon cessation of the rotation of said spindle.

3. In a toolhead, a spindle mounted for rotation therein, a cutting tool carried by said spindle, centrifugally actuated means responsive to rotation of said spindle for shifting the position of said tool relative to said spindle, and resilient means to return said tool to original position upon cessation of the rotation of said spindle.

4. In a toolhead, a rotatably mounted spindle, a tool carrying member in said spindle, and centrifugally actuated means for shifting the relative positions of said spindle and tool carrying member in response to rotation of said spindle.

5. In a toolhead, a rotatably mounted spindle, a tool carrying member eccentrically mounted for turning movement in said spindle, and centrifugally actuated means operative upon rotation of the spindle for procuring a turning movement of said member relative to said spindle for shifting the position of a tool in said carrying member relative to the axis of rotation of said spindle.

6. In a toolhead, a rotatably mounted spindle, a tool carrying member eccentrically mounted in said spindle, centrifugally actuated means for procuring a turning movement of said carrying member in said spindle, and means operative upon cessation of the rotation of said spindle for procuring a turning movement of said tool carrying member in said spindle.

7. In a toolhead, a rotatably mounted spindle, a tool carrying member eccentrically mounted for turning movement in said spindle, a tool in said carrying member having an operative and an inoperative position, centrifugally actuated means operative upon rotation of said spindle for procuring a turning movement of said carrying member in said spindle to advance the tool to operative position, and means to limit the turning movement of said carrying member.

8. In a toolhead, a rotatably mounted spindle, a tool carrying member eccentrically mounted for turning movement in said spindle, a tool in said carrying member having an operative and an inoperative position, centrifugally actuated means operative upon rotation of said spindle for procuring a turning movement of said carrying member in said spindle to advance the tool to operative position, and adjustable means to limit the turning movement of said carrying member.

9. In a toolhead, a rotatably mounted spindle, a tool carrying member eccentrically mounted for turning movement in said spindle, a tool in said carrying member having an operative and an inoperative position, centrifugally actuated means operative upon rotation of said spindle for procuring a turning movement of said carrying member in said spindle to advance the tool to operative position, a notch in said tool carrying member, and adjustable means positioned in the spindle and engaging said notch for limiting the turning movement of said member in said spindle.

10. In a toolhead, a rotatable spindle, a tool carrying member mounted for turning movement in said spindle on an axis substantially parallel to and spaced from the axis of the spindle and centrifugally actuated means operative in response to rotation of said spindle for procuring a turning movement of the carrying member in said spindle.

11. In a toolhead, a rotatable spindle, a tool carrying member mounted for turning movement in said spindle on an axis substantially parallel to and spaced from the axis of the spindle, centrifugally actuated means operative in response to rotation of said spindle for procuring a turning movement of the carrying member in said spindle and resilient means operative upon cessation of rotation of the spindle for procuring a return of the carrying member to original position.

12. In a toolhead, a rotatable spindle, a tool carrying member mounted for turning movement in the spindle, centrifugally actuated means for shifting the relative positions of said spindle and tool carrying member in response to rotation of said spindle, and resilient means operative upon cessation of rotation of the spindle for returning said centrifugally actuated means to original position to return the spindle and tool carrying member to original relative positions.

13. In a toolhead, a rotatable spindle, a tool carrying member journalled in said spindle on an axis substantially parallel to and spaced from the axis of the spindle, and means for procuring a turning movement of said member in said spindle in response to the rotation of said spindle, said means comprising at least one pivotally mounted arm adapted to swing by centrifugal force when the spindle rotates, and a connection between said arm and said member.

14. In a toolhead, a rotatable spindle, a tool carrying member journalled in said spindle on an axis substantially parallel to and spaced from the axis of the spindle, means for procuring a turning movement of said member in said spindle in response to the rotation of said spindle, said means comprising at least one pivotally mounted arm adapted to swing by centrifugal force when the spindle rotates, and a connection between said arm and said member, and a spring normally engaging said arm for returning said arm to original position upon cessation of rotation of the spindle.

15. In a toolhead, a rotatable spindle, a tool carrying member journalled in said spindle on an axis substantially parallel to and spaced from the axis of the spindle, means for procuring a turning movement of said member in said spindle in response to the rotation of said spindle, said means comprising at least one pivotally mounted arm adapted to swing by centrifugal force when the spindle rotates, and a connection between said arm and said member, and a stop for limiting the relative turning movement of the tool member in the spindle.

16. In a toolhead, a rotatable spindle, a tool carrying member journalled in said spindle on an axis substantially parallel to and spaced from the axis of the spindle, means for procuring a turning movement of said member in said spindle in response to the rotation of said spindle, said means comprising at least one pivotally mounted arm adapted to swing by centrifugal force when the spindle rotates, and a connnection between said arm and said member, a spring normally engaging said arm for returning said arm to original position upon cessation of rotation of the spindle, and a stop for limiting the turning movement of the tool carrying member in the spindle.

WILLIAM D. SCHMIDT.

CERTIFICATE OF CORRECTION.

Patent No. 2,058,359.  October 20, 1936.

WILLIAM D. SCHMIDT.

It is hereby certified that error appears in the printed specification of the above numbered patent requiring correction as follows: Page 4, second column, line 43, claim 3, before "and" insert the words means for limiting the shifting movement for determining the operative position of the tool; and that the said Letters Patent should be read with this correction therein that the same may conform to the record of the case in the Patent Office.

Signed and sealed this 29th day of December, A. D. 1936.

Henry Van Arsdale